No. 770,981. PATENTED SEPT. 27, 1904.
F. P. PFLEGHAR.
DRIVING MECHANISM.
APPLICATION FILED OCT. 24, 1903.
NO MODEL. 2 SHEETS—SHEET 2.
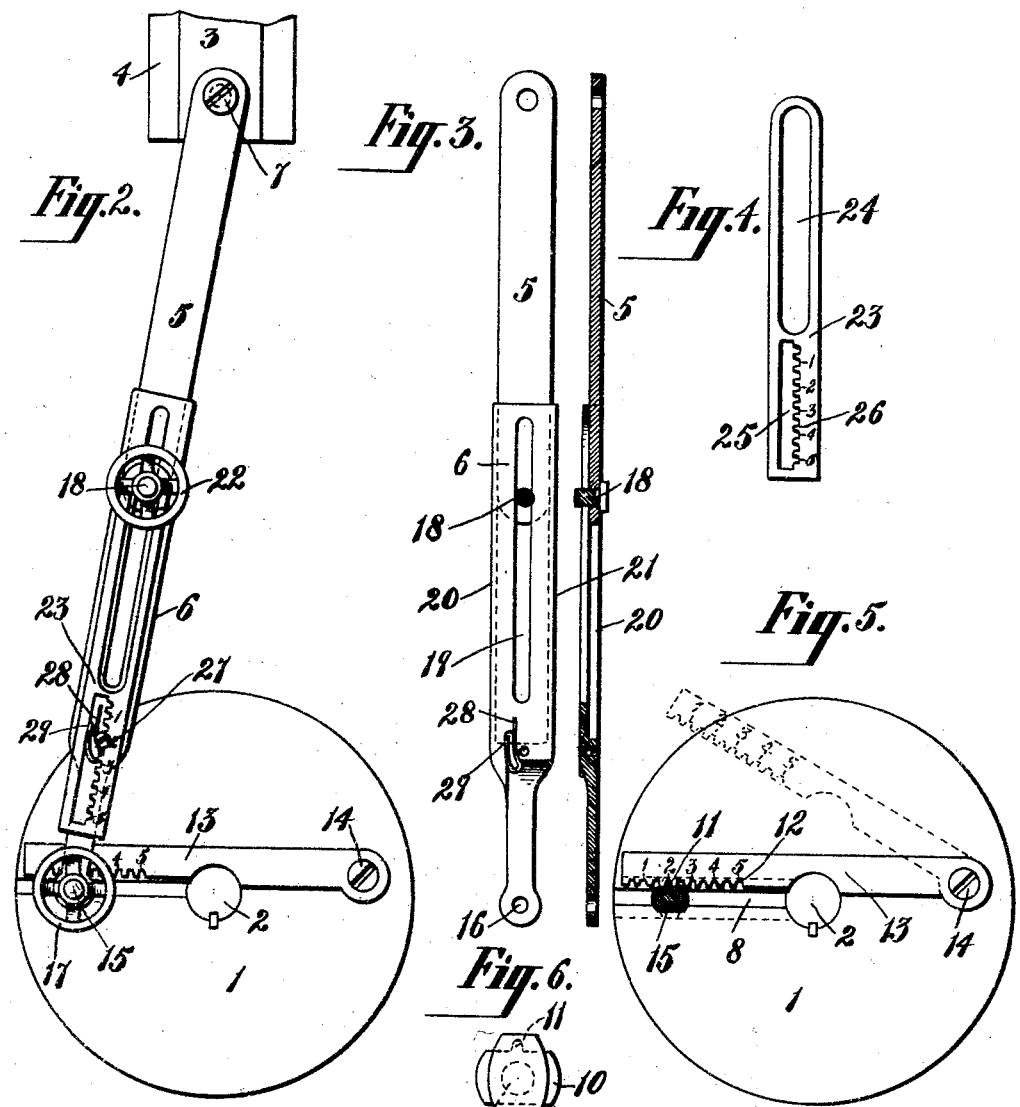
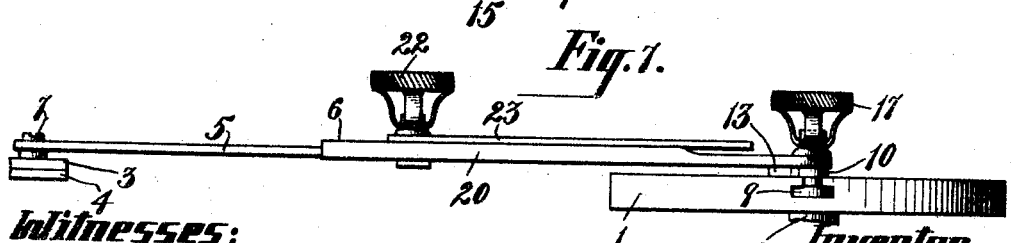
Witnesses: Inventor:
F. G. Hachenberg. Frank P. Pfleghar
Henry Thieme. by attorney No. 770,981. Patented September 27, 1904.

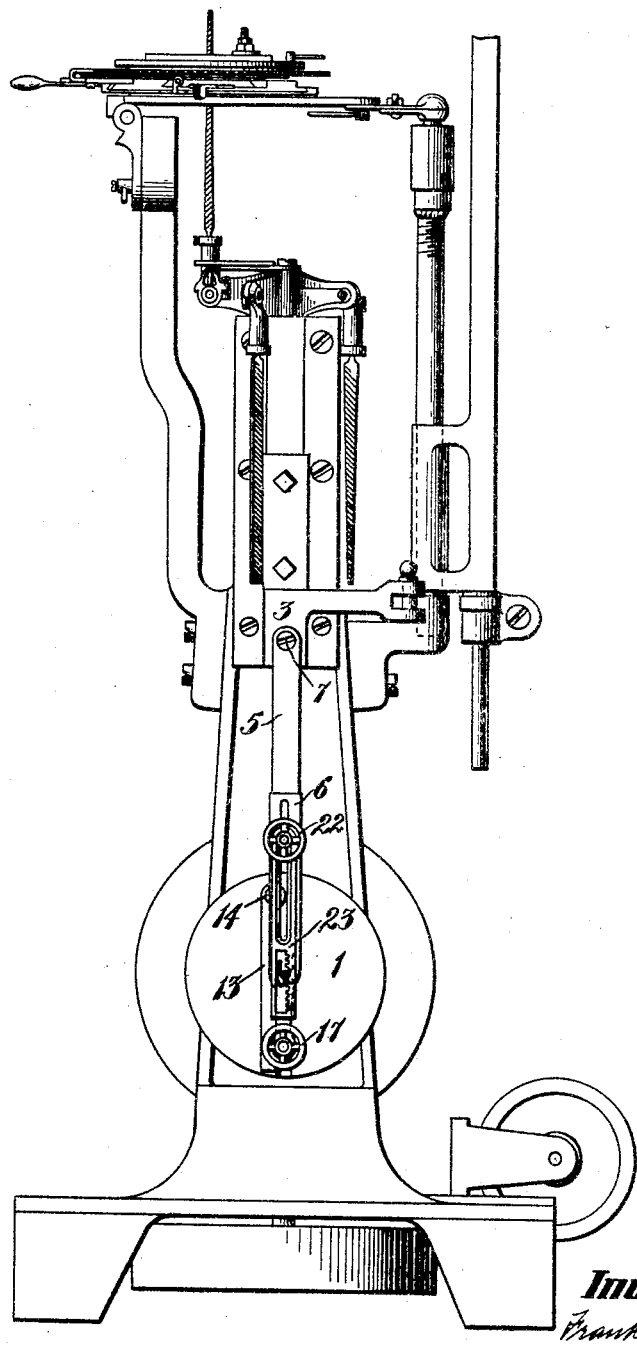

UNITED STATES PATENT OFFICE.

FRANK P. PFLEGHAR, OF NEW HAVEN, CONNECTICUT.

DRIVING MECHANISM.

SPECIFICATION forming part of Letters Patent No. 770,981, dated September 27, 1904.

Application filed October 24, 1903. Serial No. 178,359. (No model.)

*To all whom it may concern:*

Be it known that I, FRANK P. PFLEGHAR, a citizen of the United States, and a resident of New Haven, in the county of New Haven and State of Connecticut, have invented a new and useful Improvement in Driving Mechanism, of which the following is a specification.

My invention relates to an improvement in driving mechanism, and has more particularly for its object to provide an improved adjustable connection between a reciprocating part and a rotary part whereby the amount of movement of the reciprocating part may be accurately adjusted with respect to the movement of the rotary part.

A further object is to provide an extensible and contractible connection between the rotary and reciprocating parts, together with a gage for limiting the extension of the connection, but permitting its contraction without interfering with the gage.

A practical embodiment of my invention is represented in the accompanying drawings, in which—

Figure 1 represents a saw-filing machine with my improved driving mechanism applied thereto. Fig. 2 is an enlarged view of the driving mechanism in side elevation. Fig. 3 represents the adjustable connection in side view and in vertical central section with its gage-plate removed. Fig. 4 is a face view of the gage-plate which forms part of the adjustable connection. Fig. 5 is a face view of the rotary part with its gage-plate in position, the toothed slide of the adjustable connection being shown in section in one of its adjustments. Fig. 6 is an enlarged inverted plan view of the toothed slide of the adjustable connection, and Fig. 7 is a view in edge elevation of the driving mechanism.

The rotary part is herein shown as a disk 1, keyed to the driving-shaft 2 of the machine, to which the driving mechanism is applied. The reciprocating part is represented as a slide 3, which slide in the present instance forms part of the operating-carriage of a saw-filing machine and is fitted to reciprocate in suitable guides 4. The extensible and contractible connection between the rotary and reciprocating parts consists of two members 5 and 6, the outer end of the member 5 being pivoted at 7 to the reciprocating part 3 and the outer end of the member 6 being adjustably pivoted to the rotary part 1 as follows: The rotary part 1 is provided with a radial groove 8, within which the inner portion 9 of the toothed slide is fitted to move. The outer portion 10 of the toothed slide is located exterior to the face of the rotary part 1 and is provided with a tooth 11, which is fitted to enter between two adjacent teeth of a rack 12, carried by a swinging gage-plate 13, hinged at 14 to the face of the rotary part 1 upon the opposite side of the center of the rotary part from the radial groove 8. The toothed rack 12 is provided with a scale for use in connection with a scale carried by another gage-plate to be hereinafter described. The outer portion 10 of the toothed slide is loosely mounted on a stud 15, which uprises from the inner portion 9 of the toothed slide. This stud 15 passes through an eye 16 in the outer end of the member 6 of the adjustable connection and is there provided with a screw-threaded portion, which is engaged by a hand-nut 17. When the hand-nut 17 is screwed home, the two members 9 10 will be clamped to the rotary part and the member 6 will be loosely pivoted on the stud 15.

The two members 5 and 6 have a pin-and-slot connection, in the present instance the member 5 being provided with a pin 18 and the member 6 being provided with a longitudinal slot 19, through which the pin passes. These members are guided in their longitudinal adjustment with respect to each other by providing the member 6 with side flanges 20 21, between which the sides of the member 5 slide. The pin 18 is provided with a hand-nut 22 for clamping the two members 5 and 6 in any desired longitudinal adjustment with respect to each other.

A gage-plate 23 is provided for determining the longitudinal adjustment of the members 5 and 6 with respect to the rotary adjustment of the member 6 with the rotary part, which gage-plate is provided with a longitudinally-elongated slot 24, through which the pin 18 of the member 5 extends. This gage-plate 23 is further provided with a second longitudinally-elongated slot 25, along one edge of which I provide a toothed rack 26, provided with a scale corresponding to the scale of the toothed rack 12 of the gage-plate 13. The member 6 is provided with a stud 27, which extends through the slot 25 in the gage-plate 23. This member 6 is further provided with a spring 28, the free end 29 of which is fitted to press against the plane edge of the slot 25, tending to yieldingly hold the stud 27 in engagement with one of the notches between any two of the teeth of the rack 26.

The operation of the mechanism is as follows: The gage-plate 13 on the rotary part 1 is swung back and the hand-wheel 17 is loosened, thus permitting the toothed slide 9 10 to be moved along the rotary groove 8 to a point where the gage-plate 13 when swung down will cause its rack 12 to engage the tooth 11 at any particular point on the scale. The toothed slide is then clamped in its position. The gage-plate 23, carried by the adjustable connection, is then adjusted to bring a notch in its rack 26 corresponding to the notch in the rack 11 of the gage-plate 13 into engagement with the stud 27. The member 5 is then extended until the pin 18 is limited by engaging the outer end of the elongated slot 24 in the gage-plate 23. The hand-nut 22 may then be tightened. This will cause the rotary part to transmit movement at a predetermined speed and through a predetermined distance to the reciprocating part.

In machines where it becomes necessary to temporarily draw the reciprocating part inwardly for some purpose—as for instance, in file-sawing machines, where it is necessary to withdraw the file from within the work-table for the purpose of inserting another tool—this may be done without destroying the adjustment by simply loosening the hand-nut 22 and sliding the pin 18, and thereby the member 5, inwardly. This is permitted because of the longitudinally-elongated slot 24 in the gage-plate 23. When it is desired to return the tool to its normal position with respect to the work, the member 5 may be again extended to the limit and the hand-nut 22 tightened.

What I claim as my invention is—

1. A reciprocating part, a rotary part, two members adjustably connected together, one member connected to the reciprocating part and the other member adjustably connected to the rotary part, and two plates, one carried by the members for determining their extension with respect to each other and the other plate carried by the rotary part for determining the adjustable connection of the member to the rotary part with respect to the extension of the two members, the two plates also serving as gages.

2. A reciprocating part, a rotary part, two members adjustably connected together, one member being connected to the reciprocating part and the other member connected to the rotary part, a plate for determining the extension of the members with respect to each other and permitting them to be contracted.

3. A reciprocating part, a rotary part having a radial groove therein, two members adjustably connected together, one member being connected to the reciprocating part, a toothed slide connected to the other member fitted to move along said groove, and a plate arranged to be brought into engagement with the toothed slide for determining the adjustable connection between the said member and rotary part.

In testimony that I claim the foregoing as my invention I have signed my name, in presence of two witnesses, this 19th day of October, 1903.

FRANK P. PFLEGHAR.

Witnesses:
FREDK. HAYNES,
R. B. SEWARD.